(12) United States Patent
Breed et al.

(10) Patent No.: US 11,244,315 B2
(45) Date of Patent: Feb. 8, 2022

(54) AUTHENTICATION SYSTEM FOR CONTROLLING ACCESS AND USE BASED ON HEARTBEAT SHAPE

(71) Applicant: Intelligent Technologies International, Inc., Miami Beach, FL (US)

(72) Inventors: David S Breed, Miami Beach, FL (US); Wilbur E DuVall, Katy, TX (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 151 days.

(21) Appl. No.: 15/927,708

(22) Filed: Mar. 21, 2018

(65) Prior Publication Data
US 2018/0276672 A1  Sep. 27, 2018

Related U.S. Application Data

(60) Provisional application No. 62/474,560, filed on Mar. 21, 2017.

(51) Int. Cl.
*G06Q 20/40* (2012.01)
*G06Q 20/34* (2012.01)
(Continued)

(52) U.S. Cl.
CPC ... *G06Q 20/40145* (2013.01); *G06F 13/4282* (2013.01); *G06F 21/32* (2013.01);
(Continued)

(58) Field of Classification Search
CPC . G06Q 20/4012; G06Q 20/3223; G06F 21/32
(Continued)

(56) References Cited

U.S. PATENT DOCUMENTS

| 4,334,544 A | 6/1982 | Hill et al. |
|---|---|---|
| 6,783,501 B2 | 8/2004 | Takahashi et al. |

(Continued)

FOREIGN PATENT DOCUMENTS

| JP | 2000041962 A | 2/2000 |
|---|---|---|
| JP | 2016174642 A | 10/2016 |

OTHER PUBLICATIONS

J. Hernandez, D. J. McDuff and R. W. Picard, "BioInsights: Extracting personal data from "Still" wearable motion sensors," 2015 IEEE 12th International Conference on Wearable and Implantable Body Sensor Networks (BSN), 2015, pp. 1-6, doi: 10.1109/BSN.2015.7299354. (Year: 2015).*

(Continued)

*Primary Examiner* — Kelly S. Campen
*Assistant Examiner* — John O Preston
(74) *Attorney, Agent, or Firm* — Brian Roffe

(57) ABSTRACT

Authentication system for enabling access or use includes a housing, a database of fingerprint and heartbeat data, a fingerprint sensor having a surface on an exterior of the housing onto which a person places their finger, and a heartbeat monitor that obtains data about presence of any heartbeat from a person whose fingers are placed onto the surface of the fingerprint sensor. A processor coupled to the fingerprint sensor, heartbeat monitor and database operatively compares the obtained fingerprint and heartbeat shape derived from heartbeat data to corresponding fingerprint and heartbeat shape data to determine whether the fingerprint and heartbeat shape data are indicative of a person authorized for access or use. Only if both the fingerprint and heartbeat shape data are indicative of the same person authorized for access or use, the processor authorizes access or use, e.g., to a cellphone, of a payment card, and to an access-controlled structure.

12 Claims, 15 Drawing Sheets

(51) Int. Cl.

| | |
|---|---|
| *G06F 13/42* | (2006.01) |
| *G06K 9/00* | (2006.01) |
| *G06F 21/32* | (2013.01) |
| *G06Q 20/32* | (2012.01) |
| *G06F 7/08* | (2006.01) |
| *H04M 1/72454* | (2021.01) |
| *H04M 1/02* | (2006.01) |
| *H04M 1/67* | (2006.01) |
| *G07F 7/08* | (2006.01) |

(52) U.S. Cl.
CPC ....... *G06K 9/0012* (2013.01); *G06K 9/00013* (2013.01); *G06K 9/00087* (2013.01); *G06K 9/00604* (2013.01); *G06K 9/00892* (2013.01); *G06Q 20/32* (2013.01); *G06Q 20/34* (2013.01); *G07F 7/0813* (2013.01); *G07F 7/0826* (2013.01); *H04M 1/72454* (2021.01); *G06F 2221/2139* (2013.01); *G06K 2009/00939* (2013.01); *H04M 1/0202* (2013.01); *H04M 1/026* (2013.01); *H04M 1/67* (2013.01)

(58) Field of Classification Search
USPC .......................................................... 235/379
See application file for complete search history.

(56) References Cited

U.S. PATENT DOCUMENTS

| | | | |
|---|---|---|---|
| 7,415,138 B2 | 8/2008 | Schneider et al. | |
| 7,689,833 B2 * | 3/2010 | Lange ...................... | A61B 5/35 713/186 |
| 7,921,297 B2 | 4/2011 | Ortiz et al. | |
| 8,019,321 B2 | 9/2011 | Engstrom | |
| 8,380,247 B2 | 2/2013 | Engstrom | |
| 8,649,765 B1 | 2/2014 | Hjelm et al. | |
| 8,818,498 B2 | 8/2014 | Terada | |
| 8,968,195 B2 | 3/2015 | Tran | |
| 9,280,860 B2 | 3/2016 | Malhotra et al. | |
| 9,349,035 B1 | 5/2016 | Gerber et al. | |
| 9,414,746 B2 | 8/2016 | Bergman et al. | |
| 9,763,620 B2 | 9/2017 | Li et al. | |
| 9,811,713 B2 | 11/2017 | Pi et al. | |
| 9,814,426 B2 | 11/2017 | Connor | |
| 9,824,287 B2 | 11/2017 | Wang et al. | |
| 9,830,495 B2 | 11/2017 | Slaby et al. | |
| 9,870,457 B2 | 1/2018 | Lux et al. | |
| 9,870,716 B1 * | 1/2018 | Rao ........................ | G09B 5/065 |
| 9,892,576 B2 | 2/2018 | Kursun | |
| 10,089,802 B2 | 10/2018 | Chang et al. | |
| 10,213,156 B2 | 2/2019 | Min et al. | |
| 10,452,825 B2 | 10/2019 | Wu et al. | |
| 10,466,475 B2 | 11/2019 | Chen | |
| 10,765,332 B2 | 9/2020 | Harrer et al. | |
| 2004/0238621 A1 | 12/2004 | Beenau et al. | |
| 2006/0000894 A1 | 1/2006 | Bonalle et al. | |
| 2008/0171945 A1 | 7/2008 | Dotter | |
| 2009/0145972 A1 | 6/2009 | Evans | |
| 2009/0150994 A1 | 6/2009 | Evans | |
| 2009/0253996 A1 | 10/2009 | Lee et al. | |
| 2012/0028680 A1 * | 2/2012 | Breed .................. | B60N 2/0232 455/556.1 |
| 2013/0307670 A1 | 11/2013 | Ramaci | |
| 2015/0024601 A1 | 1/2015 | Zhou | |
| 2015/0146944 A1 | 5/2015 | Pi et al. | |
| 2015/0264567 A1 * | 9/2015 | Sensharma ........... | H04W 12/06 455/411 |
| 2015/0348046 A1 | 12/2015 | Battle | |
| 2016/0183812 A1 | 6/2016 | Zhang et al. | |
| 2016/0224773 A1 | 8/2016 | Ramaci | |
| 2016/0283703 A1 | 9/2016 | Allyn | |
| 2016/0314334 A1 | 10/2016 | He et al. | |
| 2016/0350581 A1 | 12/2016 | Manuel et al. | |
| 2017/0337414 A1 | 11/2017 | Ohno et al. | |
| 2018/0005005 A1 | 1/2018 | He et al. | |
| 2018/0046281 A1 | 2/2018 | Pi et al. | |
| 2018/0082304 A1 * | 3/2018 | Summerlin ............... | G06N 3/08 |

OTHER PUBLICATIONS

Y. Zheng et al., "Unobtrusive Sensing and Wearable Devices for Health Informatics," in IEEE Transactions on Biomedical Engineering, vol. 61, No. 5, pp. 1538-1554, May 2014, doi: 10.1109/TBME.2014.2309951. (Year: 2014).*

Proceedings of the 10th International Conference on Ubiquitous Information Management and Communication. Jan. 2016 Article No. 18pp. 1-7https://doi.org/10.1145/2857546.2857565 (Year: 2016).*

Chen Song, et al., Cardiac Scan: A Non-Contact and Continuous Heart-Based User Authentication System, MobiCom'17, Oct. 16-20, 2017, Snowbird, Utah, USA.

Biometrics: A heart to my key, May 9, 2013, Economist.com.

* cited by examiner

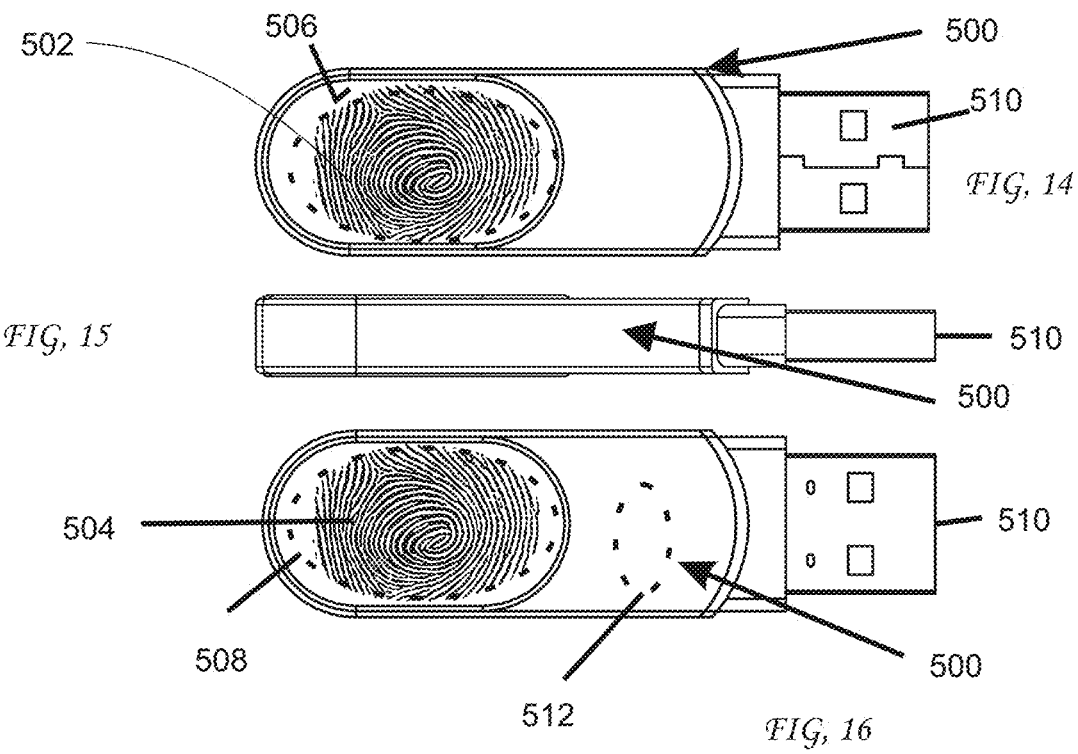
FIG. 14
FIG. 15
FIG. 16
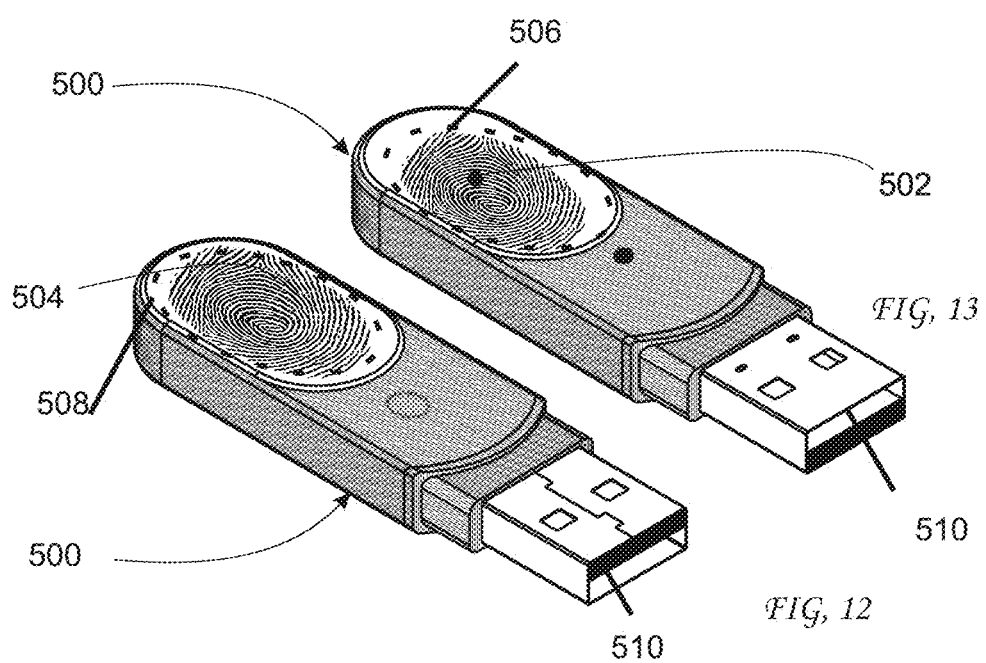
FIG. 13
FIG. 12

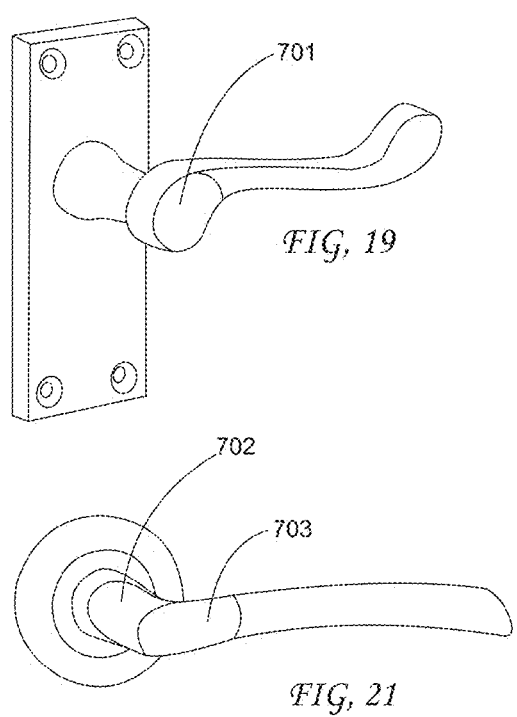
FIG. 19
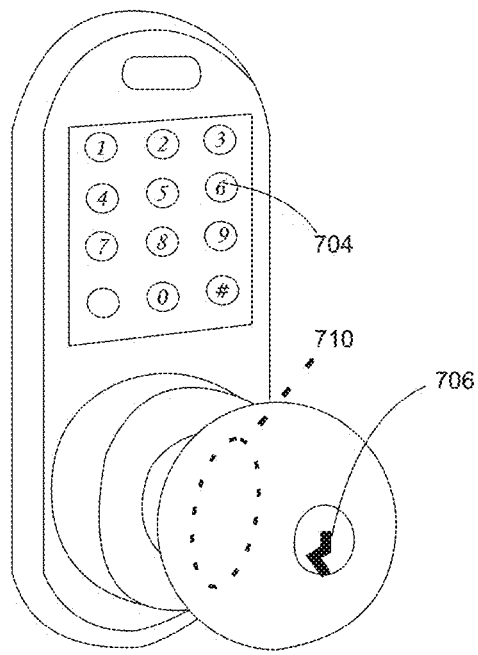
FIG. 20
FIG. 21
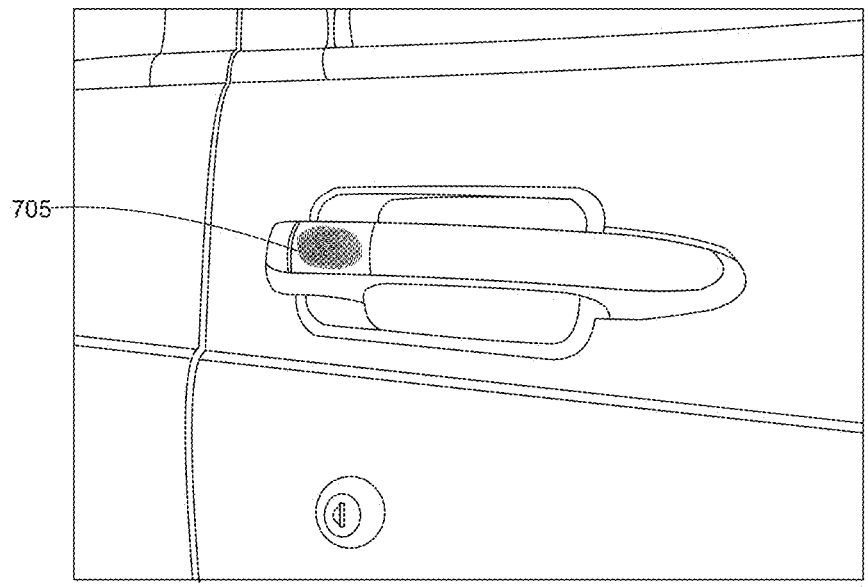
FIG. 22

AUTHENTICATION SYSTEM FOR CONTROLLING ACCESS AND USE BASED ON HEARTBEAT SHAPE

CROSS-REFERENCE TO RELATED APPLICATION

This application claims priority of U.S. provisional patent application Ser. No. 62/474,560 filed Mar. 21, 2017, now expired, which is incorporated by reference herein.

FIELD OF THE INVENTION

The present invention relates to systems, arrangements and methods that control access to a vehicle, electronic device, room and other access-controlled objects based on shape of a heartbeat as measured on a finger or other locations on a human body using either optical, ultrasonic or capacitive methods, such that the heartbeat shape serves as a biometric identifier for a person.

BACKGROUND OF THE INVENTION

The use of the detection of a heartbeat as a determination that a fingerprint being measured was from a live finger was disclosed by the current assignee's in U.S. patent application Ser. No. 14/448,598 filed Jul. 31, 2014, incorporated by reference herein.

Fingerprints have long been used as a biometric measurement to identify individuals. They have historically been used to tie criminals to the scene of a crime and more recently, they have found widespread use to identify and control access to the owner of an electronic device such as a smartphone. Such fingerprint devices, however, are easily spoofed through substituting a photograph, plastic or even a silly putty copy of a fingerprint. To counter this spoofing attack, detection of a heartbeat through the finger has been proposed by the current assignee. This also is subject to spoofing, however, since the fingerprint copy can be mounted onto a real finger. The problem to be solved, therefore, is to further increase the accuracy of fingerprint measurement systems in identifying an individual.

OBJECTS AND SUMMARY OF THE INVENTION

An object of an embodiment of the invention is to increase accuracy of fingerprint measurement systems in identifying individuals. This is accomplished through adding shape of the heartbeat as measured through one or more fingers during the acquisition of a fingerprint by a sensor.

Identification accuracy is therefore improved through comparing the measured heartbeat shape with stored data corresponding to the expected person's heartbeat shape. Once it is understood that the shape of the heartbeat of a person contains invariant data, when normalized to account for differing pulse rates, this property can be used regardless of where on the body the heartbeat shape is measured. Another object of an embodiment of the invention is to increase accuracy of identifying a person using a fingerprint sensor by first determining that there is a pulse associated with the finger whose print is being measured and then comparing the shape of the heartbeat as measured though the finger with stored data from previous heartbeat shape measurements of the subject individual. For heartbeat shape comparison, a heartbeat signal from at least two heartbeat sensors is required.

A two level authentication system for enabling access or use in accordance with the invention includes a housing, a database of fingerprint and heartbeat shape data (embodied as or in one or more memory media or components), a fingerprint sensor arranged in the housing and having a surface on an exterior of the housing onto which a person places their finger to obtain a fingerprint of the person, and heartbeat sensors arranged in the housing and each obtaining data about presence of any heartbeat from a person whose finger is placed onto the surface of the fingerprint sensor. It is possible for there to be no heartbeat if a fingerprint copy is pasted to an inanimate object. A processor is coupled to the fingerprint sensor, the heartbeat sensors and the database and operatively compares the fingerprint obtained by the fingerprint sensor and data about heartbeat shape derived from the heartbeat sensors to corresponding fingerprint and heartbeat shape data obtained from the database to determine whether the fingerprint and heartbeat shape data are indicative of a person authorized for access or use. Only if both the fingerprint and heartbeat shape data are indicative of the same person authorized for access or use, the processor authorizes access or use, e.g., to an electronic device such as a cellphone, of a payment card, and to a door, room or other access-controlled structure.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIGS. 12-16 show a fingerprint sensor with heartbeat monitor on a USB thumb fob.

FIGS. 19-22 show various types of door and car handles with heartbeat sensor locations.

DETAILED DESCRIPTION OF PREFERRED EMBODIMENTS

Figure 1:
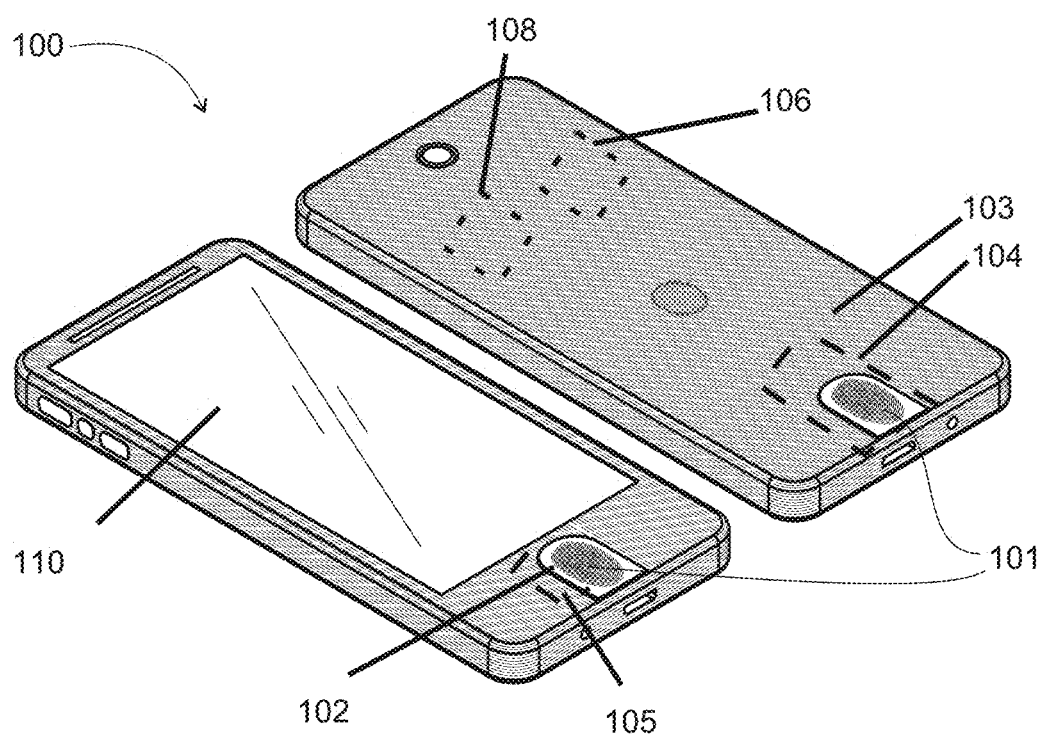
FIG. 1 shows a fingerprint sensor with heartbeat measurement on a cellphone.

A primary goal of at least one embodiment of this invention is to provide a system for measuring and recording the shape of the heartbeat and to use this information as a biometric for identifying an individual. One method of acquiring the heartbeat shape data is to perform the heartbeat shape data acquisition while a fingerprint is being acquired, i.e., simultaneously or at the same time. This system will thus provide a second biometric measurement of the person in addition to the fingerprint. It will not only determine that it is a live finger being tested, thereby defeating certain spoofing techniques, but the shape of the heartbeat contains information which can be used to further identify the person.

The heartbeat shape biometric data is not required to be used in combination with fingerprint data, or with any other biometric data. It can be used as an independent authentication factor to control access to a room, vehicle, and the like. Alternatively, it can be used with one or more other biometric data parameters to authenticate an individual, including but not limited to fingerprint data. As used herein, an "access-controlled object" for which the authentication according to the invention will be effective, includes, but is not limited to, a room, office, apartment, vehicle, electronic device, and a memory or data storage component.

Several embodiments of an authentication system for enabling access or use to the access-controlled object in accordance with the invention are disclosed herein. They share common features, namely, a housing, a first biometric sensor arranged on the housing to obtain biometric data of the person, and a heartbeat monitor arranged on the housing and having at least two contact areas. Recitation of the biometric sensor and heartbeat monitor on the housing (as well as other components arranged on the housing) should be broadly construed to mean that they may be partly or entirely in the housing, partly or entirely inside the housing, partly or entirely within the housing, partly or entirely outside of the housing and attached thereto, etc.

A processor is coupled to the first biometric sensor and the heartbeat monitor, and may be arranged on the housing or coupled to the first biometric sensor and heartbeat monitor via a connector leading away from the housing. The processor, wherever located, derives data about shape of a heartbeat of a person when the person is in contact with the contact areas. Additionally, the processor compares the biometric data obtained by the first biometric sensor to corresponding biometric data about one or more authorized users of the access-controlled object to determine whether the biometric of the person is that of a user authorized to access the access-controlled object. The processor also compares the data about the shape of the heartbeat of the person obtained by the heartbeat monitor to heartbeat shape data about the one or more authorized users of the access-controlled object to determine whether the heartbeat shape of the person is that of a user authorized to access the access-controlled object. This comparison may be any type of analysis of current data relative to previously obtained data that is associated with known people.

An access-control device, functionality or unit has a first state preventing access to the access-controlled object and a second state allowing access to the access-controlled object. This access-control unit is designed to transition from its first state to its second state when the processor determines that the biometric data of the person is that of a user authorized to access the access-controlled object and the heartbeat shape of the person is that of a user authorized to access the access-controlled object. However, the access-control unit is configured to remain in its first state when either the processor does not determine that the biometric data of the person is that of a user authorized to access the access-controlled object or the processor does not determine that the heartbeat shape of the person is that of a user authorized to access the access-controlled object (and obviously when both situations are present).

The access-control unit may be one of a number of different objects including electronic objects, cell phones, smartphone, tablets, laptops, portable memory or data storage device, and electronic watches. In such cases, the access-control unit would be electronic componentry (hardware and/or software) in the housing that is directed by the processor to unlock functionality of the electronic object. The access-control unit can also be electronic circuitry that controls display of content on a display and is directed by the processor to display user-variable content in its second state (e.g., a test when the housing is on glasses used for testing purposes) and refrain from displaying user-variable content in its first state.

Person identification apparatus applications can be divided into three main areas: security, finance, and communications. In particular, biometric identification apparatus employ measurements of the characteristics of various parts of the human body which cannot be lost or easily copied.

Preferred embodiments of the invention employ at least two-level person identification, namely, electrocardiogram (heartbeat shape) and fingerprints. In such embodiments, a live human body can be identified by scanning the biological signals of the heartbeat and fingerprint simultaneously from one extracting unit.

A cellphone owner, for example, can have a two-identity level authentication system for his/her data protection on the cell phone. The first is measurement of the electrical activity of the heart acquired by a biosensor. The second is a fingerprint scan. An example of a combined sensing device on a smartphone 100 (the access-controlled device) is shown in FIG. 1. A fingerprint sensor 101 can be on a front side 102 and/or on a rear side 103 of the smartphone 100. For the fingerprint sensor 101, this allows for acquisition of the fingerprints from two fingers.

A heartbeat sensor 104 underlies the fingerprint sensor 101 on the rear side 103 of a housing of the smartphone 100 and a second heartbeat sensor 105 underlies the fingerprint sensor 101 on the front side of the smartphone 100. By underlying, it is meant that the heartbeat sensor is integrated into the fingerprint sensor such that it interacts with the finger of the person to enable a heartbeat shape to be derived. Collectively, the heartbeat sensors 104, 105 are referred to as a heartbeat monitor.

More specifically, to derive a heartbeat shape, a voltage signal across tissue is required and a voltage signal is generated between the two heartbeat sensors 104, 105. This is the electrical signal that causes the heart to pump blood. Density of blood changes with heartbeat and is easily detected for a pulse rate. However, an ECG/EKG signal is a measure of voltage (usually in a microvolt range) which causes the heart to function, i.e., voltage across tissue, and therefore requires at least two electrical connections to the body. A standard hospital EKG uses twelve electrical connections, but the invention can use a plurality, i.e., a minimum of two contact points with the person, although more may provide a more easily derivable heartbeat shape.

Construction of the heartbeat sensors 104, 105 to enable a voltage to pass through the tissue between the parts of the person interacting with both heartbeat sensors 104, 105, i.e., two different fingers in contact with the heartbeat sensors 104, 105 at the same time, is known to those skilled in the art of heartbeat sensors. A processor 106 is coupled to the fingerprint sensors 101 and the heartbeat sensors 104, 105 and is arranged in the housing, i.e., part of the smartphone componentry. The processor 106 derives data about shape of a heartbeat of a person when the person is in contact with the contact areas of the heartbeat sensors 104, 105, i.e., at the same time. Processor 106 compares the biometric data obtained by the fingerprint sensors 101 to corresponding fingerprint data about one or more authorized users of the smartphone 100 to determine whether the fingerprint of the person is that of a user authorized to access the smartphone 100. The processor 106 also compares the derived data about the shape of the heartbeat of the person obtained by the heartbeat monitor to heartbeat shape data about the one or more authorized users of the smartphone 100 to determine whether the heartbeat shape of the person is that of a user authorized to access the smartphone 100.

Electronic componentry in the smartphone 100 (considered to be hardware and/or software) has a first state preventing access to the smartphone 100 and a second state allowing access to the smartphone 100. This electronic componentry, represented by 108, is designed to transition from its first state to its second state when the processor 106 determines that the fingerprint of the person is that of a user authorized to access the smartphone 100 and the heartbeat shape of the person is that of a user authorized to access the smartphone 100. However, the electronic componentry 108 is configured to remain in its first state when either the processor 106 does not determine that the fingerprint of the person is that of a user authorized to access the smartphone 100 or the processor does not determine that the heartbeat shape of the person is that of a user authorized to access the smartphone 100 (and obviously when both situations are present).

As an example of authorizing access, the electronic componentry 108 controls display of content on a display 110 of the smartphone 100 and is directed by the processor 106 to display user-variable content in its second state and refrain from displaying user-variable content in its first state. The display 110 would remain in a state in which it is displaying a screen saver or the like in the absence of the authentication protocol being satisfied, and then would display the welcome screen once the authentication protocol is satisfied.

Figure 2:
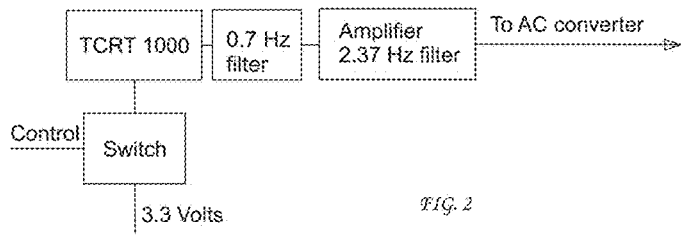
FIG. 2 shows heartbeat scan system block diagram.

FIG. 2 shows a heartbeat scan system block diagram, which would be understood by those skilled in the art to which this invention pertains without additional explanation.

Figure 3:
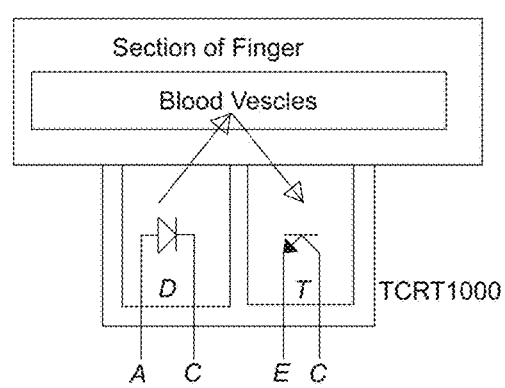
FIG. 3 illustrates the sensor structure.

FIG. 3 illustrates the sensor structure of each of the heartbeat sensors 104, 105, based on light reflection. The heartbeat scan system is integrated into the fingerprint sensor so that the finger is placed against a screen and both the fingerprint is obtained and light is transmitted and reflected by the finger to be used to obtain heartbeat data. Heartbeat data from two or more sensors is used to derive heartbeat shape data.

Figure 4:
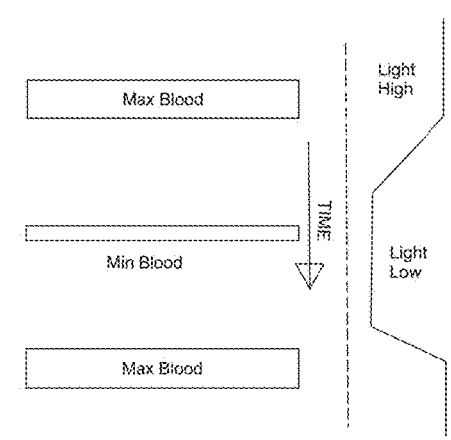
FIG. 4 illustrates the principle of reflected light changes depending on amount of blood in a blood vessel.

FIG. 4 illustrates the principle of reflected light changes depending on amount of blood in a blood vessel which correlates to heartbeat rate.

Figure 5:
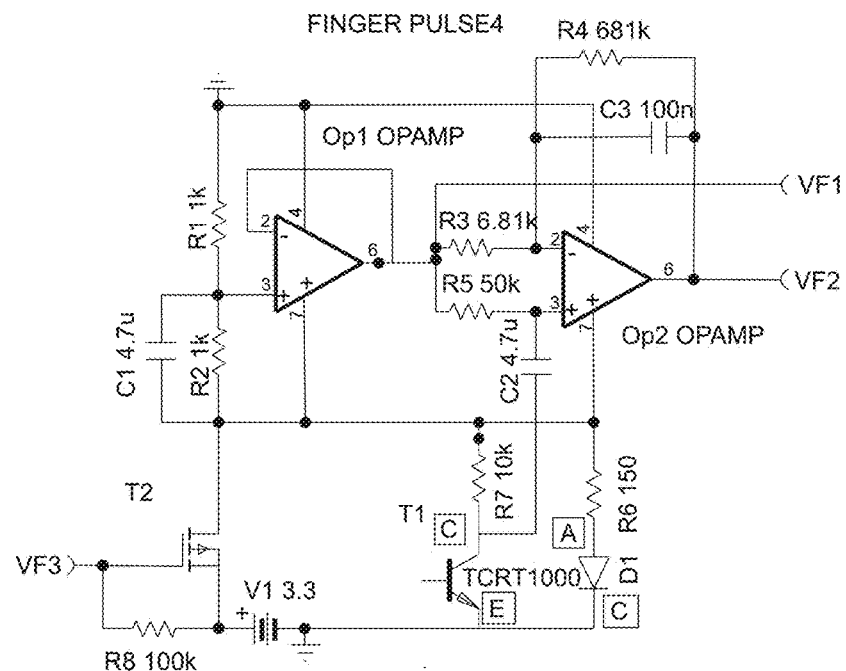
FIG. 5 illustrates the corresponding electronic circuit.

FIG. 5 illustrates the corresponding electronic circuit.

FIG. 3 shows the sensor structure, current through diode D generates 960 nm light, which passes through the skin of the finger and is reflected back to the photo sensor Transistor T. The amount of the reflected light changes with the amount of blood in the finger which changes with the heart pulse (see FIG. 4). Current from Transistor T passes through resistor R7 (see FIG. 5) which develops a voltage proportional to the reflected light. This voltage is amplified by the Amplifier OP2 which limits the signal to the bandwidth of the heart pulse. Amplifier OP1 sets the operating point for Amplifier OP2. Output of amplifier OP2 is the heart pulse within the finger. Most of the current is used for the light source/diode D, therefore it is switched ON by transistor T2 (FIG. 5). People who are Black, (the absent of Color) their finger tips that are light (have color) so light can still reach the blood cells. Other features of the electronic circuit in FIG. 5, and the manner in which they function and interact to provide the disclosed functionality, would be readily understood by those skilled in the art to which this invention pertains.

Figure 6:
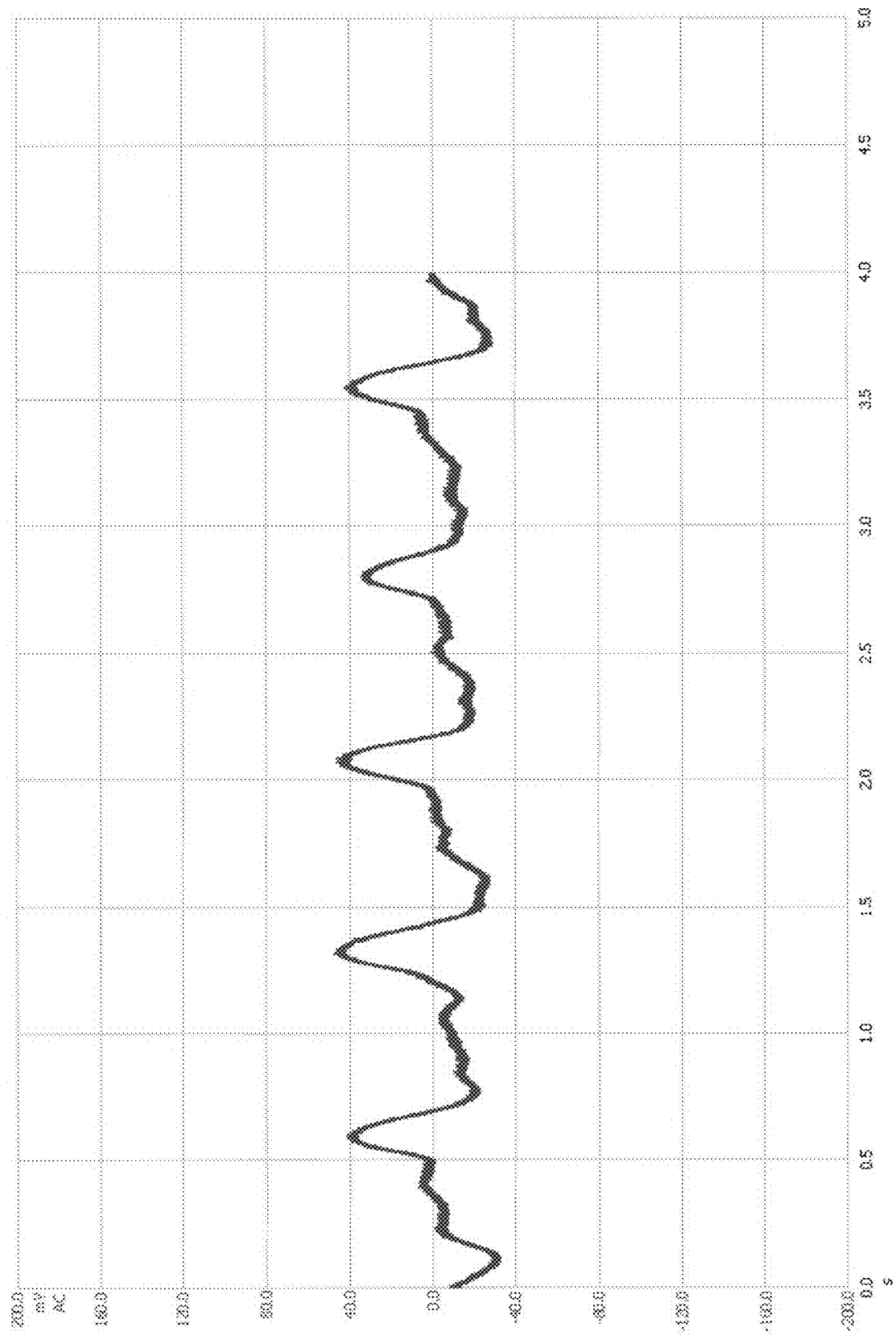
FIG. 6-10 shows heartbeat plots illustrating unique personal electrocardiographs measured by a fingerprint sensor of this invention.

Each heartbeat sensor 104, 105 reads the faint electrical current already present in the body and is completely passive. Examples from several individuals are shown in FIGS. 6-10. FIG. 6 was taken from the right hand of person, FIG. 7 from the left hand of the same person, FIG. 8 from a 13-year-old boy, FIG. 9 from a woman who did not hold still during test, and FIG. 10 from an 8-year-old girl. It can be observed that all of these traces are visibly distinct with the exception of the two traces on the first person. A Fourier analysis of these traces shows even more differences and a trained neural network can readily separate multiple traces into the persons from whom the traces were taken.

Figure 7:
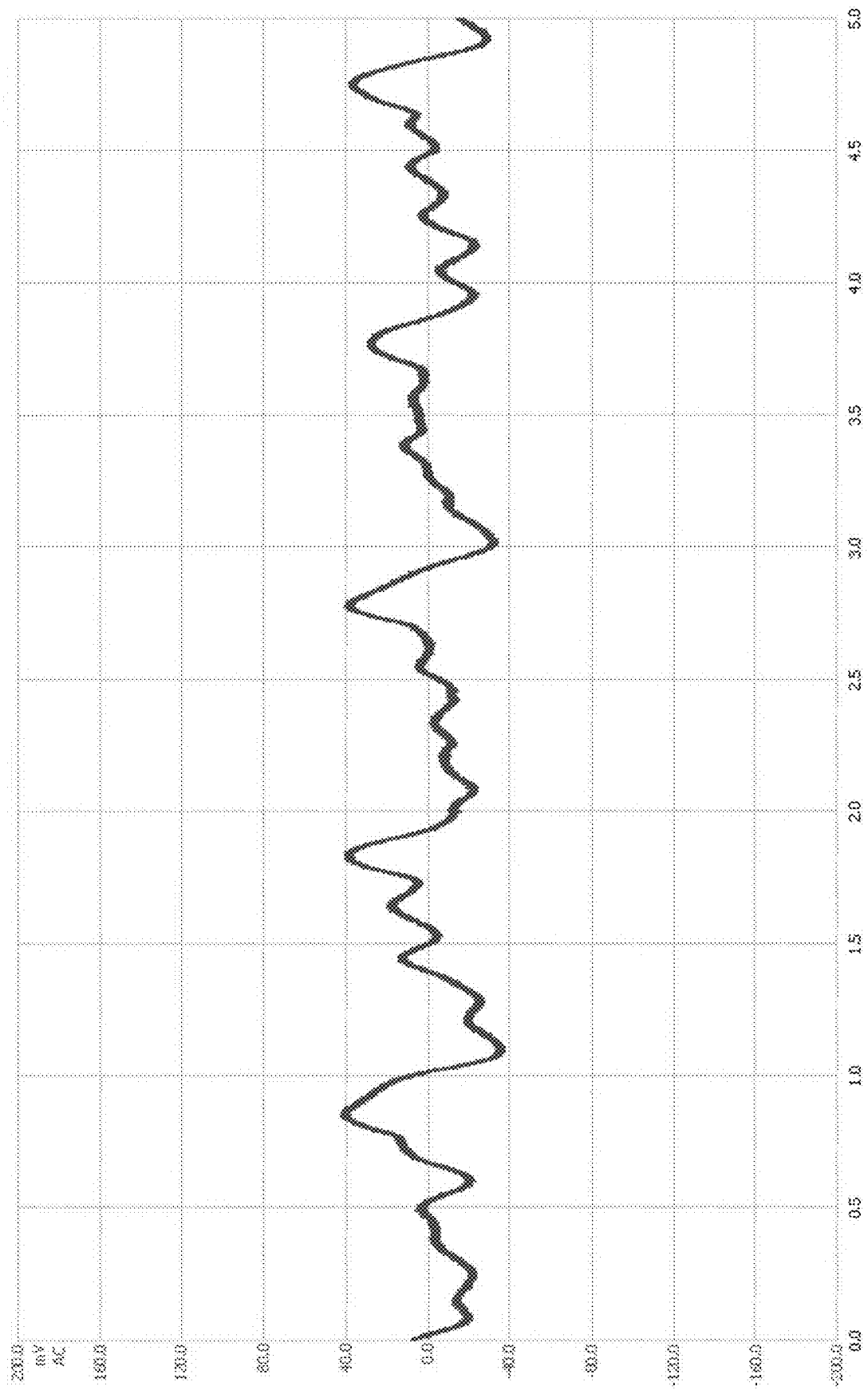
Figure 8:
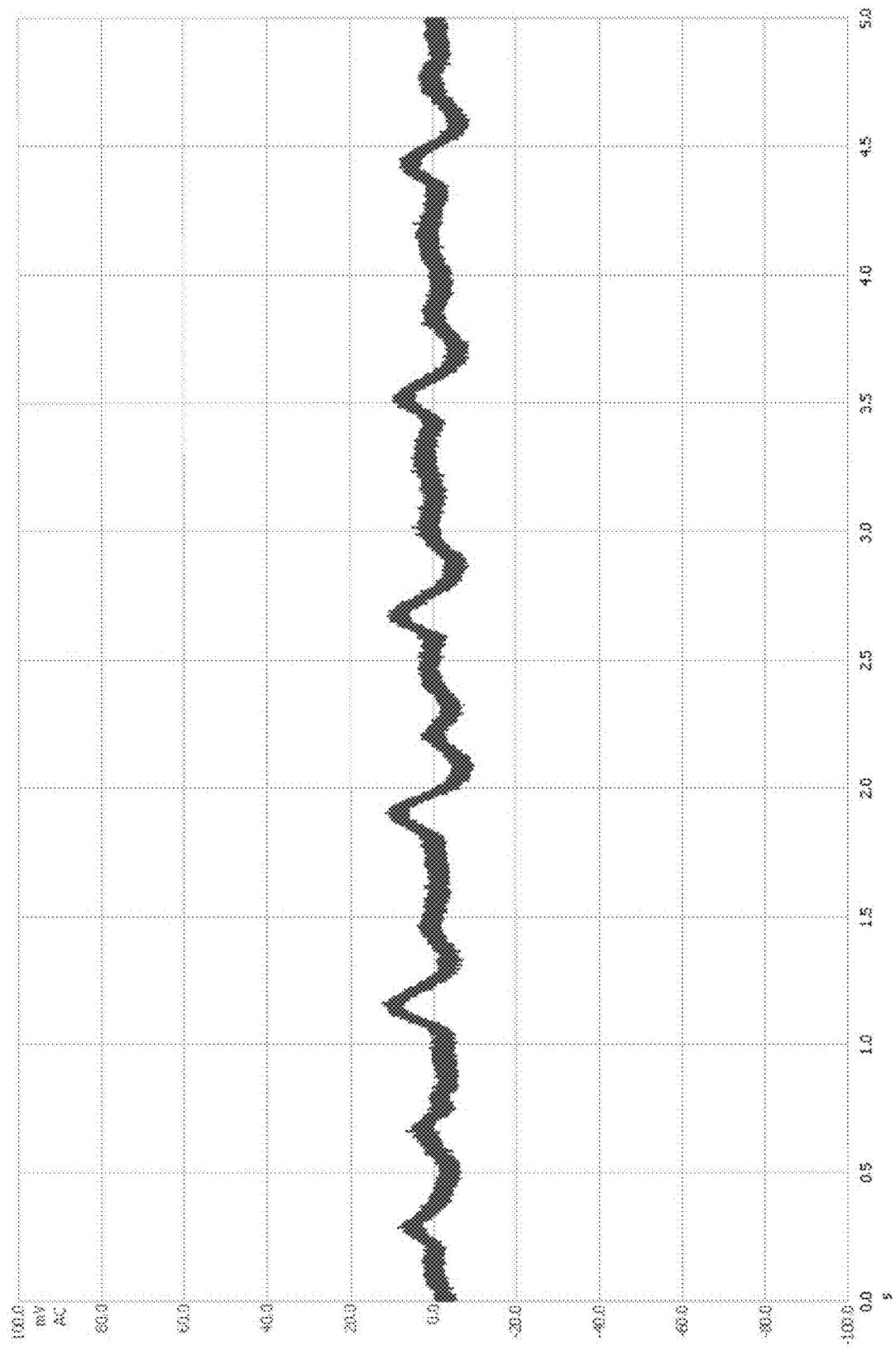
Figure 9:
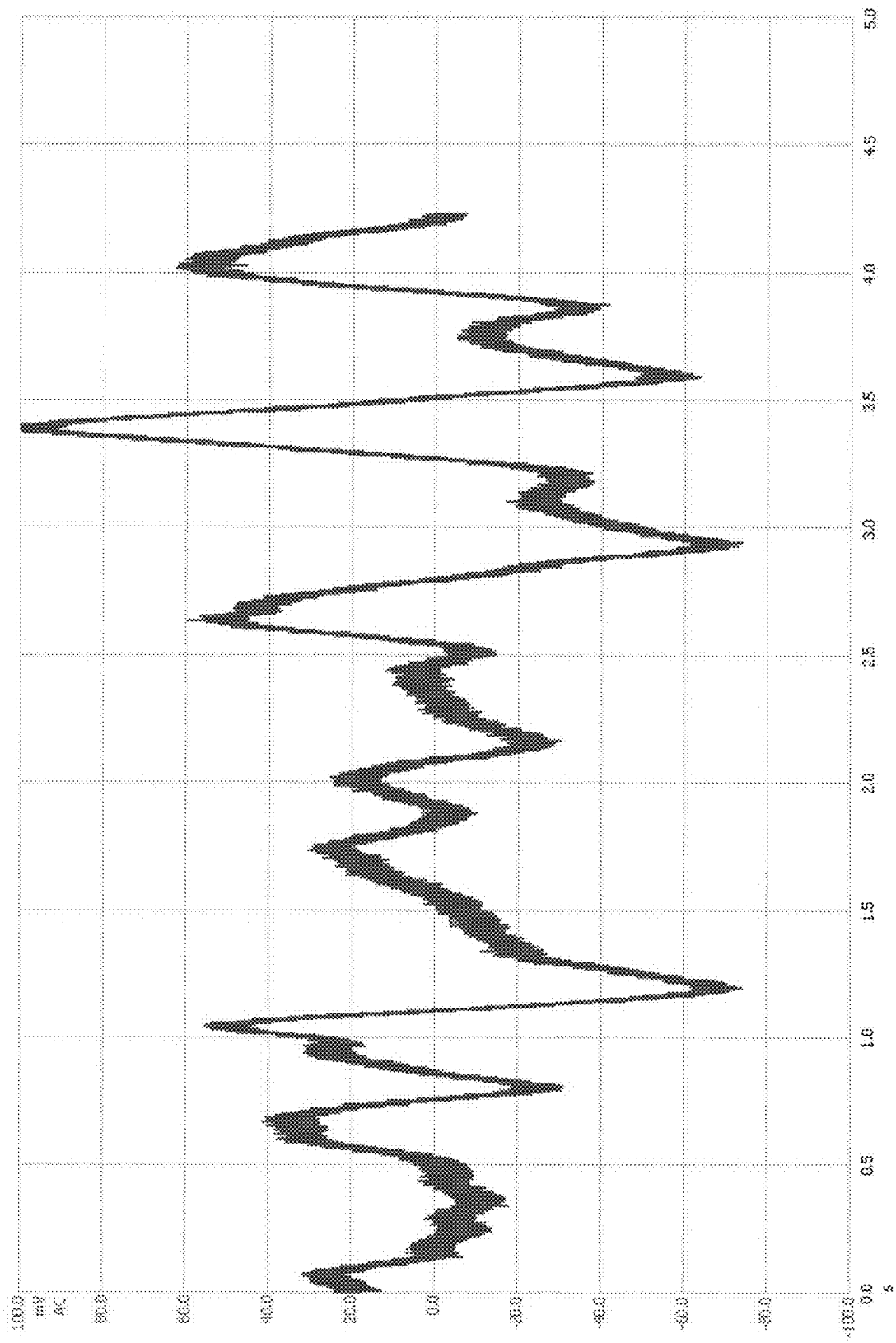
Figure 10:
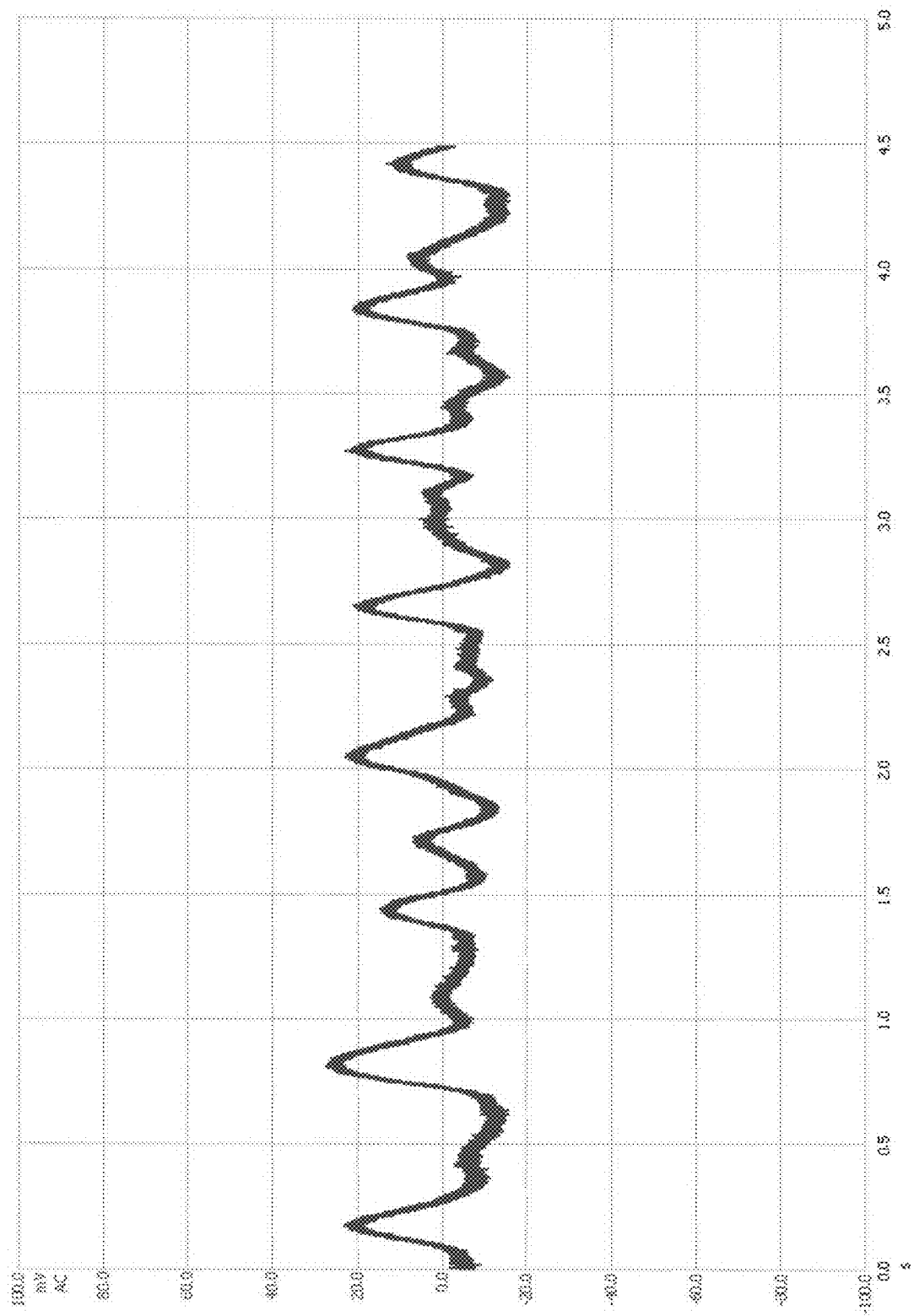

Shape of a heartbeat can be derived from the signals in FIGS. 6 and 7, right hand to left hand (i.e., the two points of contact with the person are their right hand for one contact point and their left hand for the other contact point to thereby enable voltage to pass between the right and left hands).

Figure 11:
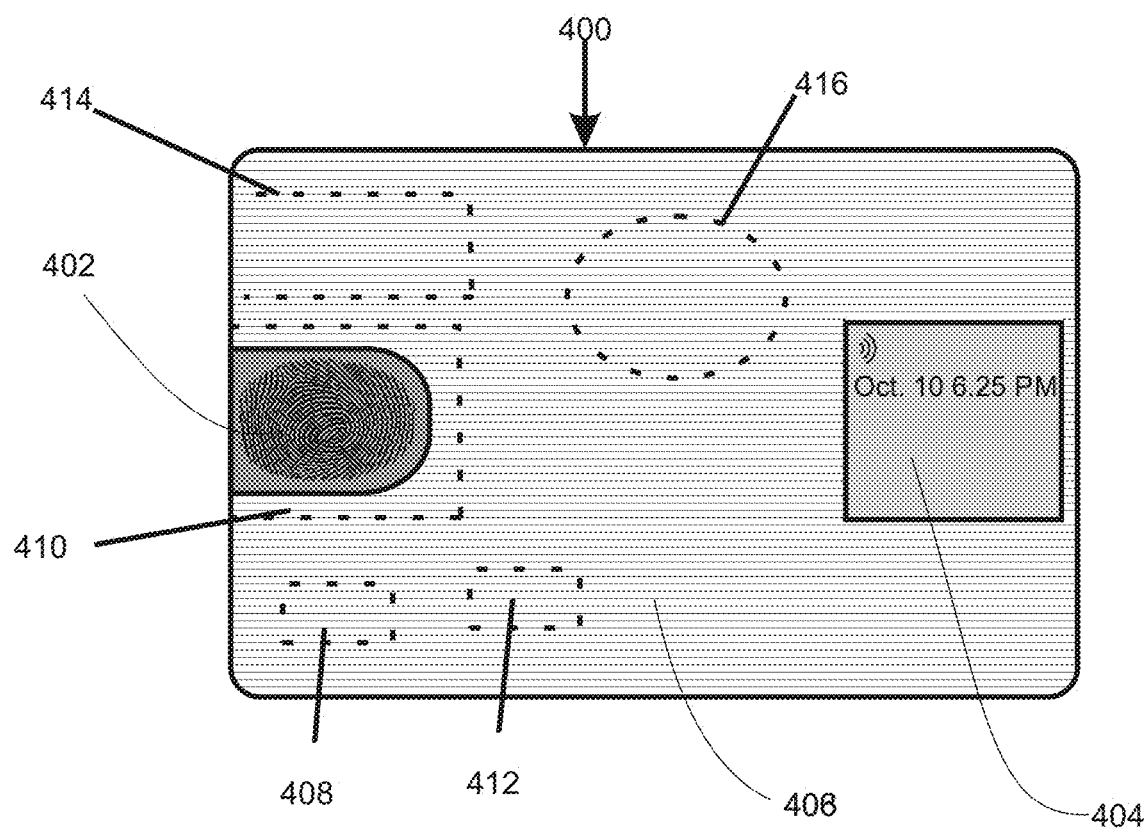
FIG. 11 shows fingerprint sensor with heartbeat monitor on a credit card.

The combination of a heartbeat monitor and a fingerprint sensor can be located on a credit card 400 (an access-controlled object) as illustrated in FIG. 11. Fingerprint-activated payment credit and debit cards are obtained. Fingerprint scanning can be provided by miniature battery-powered fingerprint reader 402 that is built inside the card 400. When a match with the card user's fingerprint takes place, the card's internal processor 408 activates the card's surface-mounted EMV chip 404 that then allows the card 400 to be used at any standard EMV compliant ATM. The card 400 can use one or more fingerprints combined with person's heartbeat signal (and shape), obtained via the heartbeat sensor 410 underlying or incorporated into the fingerprint sensor 402 to validate that the card owner is holding the card 400. The card 400 will not communicate until two biometric identification levels are passed (the fingerprint and heartbeat shape). To derive the heartbeat shape, the user must place a second finger on the second heartbeat sensor 414 and the internal processor 408 then uses the contact between two fingers and the heartbeat sensors 410, 414 to derive the heartbeat shape and compares this heartbeat shape to the known user heartbeat shape to provide the second biometric authentication, in addition to fingerprint authentication.

The smartcard 400 can contain the only copy of a unique private encryption key. This key can be maintained in volatile RAM memory 412 by a very long life battery. The card 400 can be covered by a thin film 406 which contains wires, which can be transparent, in a maze to create a chassis intrusion detector (CID). This CID verifies that the card has not been breached. If any of these wires is severed, as would necessarily happen if someone attempted to gain access to the circuitry within the card 400, the CID electronics can erase the private key and other stored data such as the owner's fingerprint and heartbeat shape data, from the volatile memory 412 and the card is thereafter useless.

A heartbeat pulse shape can be simultaneously recorded in card memory storage, possibly RAM or volatile memory 412. If the fingerprints and the heartbeat pulse shape match those stored in memory, as determined by a processor on the card 400, then the card 400 can transmit an identification number using a transmission device on the card 400 known to those skilled in this art. For a more detailed description of this smartcard design without the heartbeat monitor, see PCT Application No. PCT/US15/56710.

Processor 408 derives data about shape of a heartbeat of a person when the person is in contact with the contact areas of the heartbeat sensors 410, 414. Processor 408 compares the fingerprint obtained by the fingerprint sensor 402 to corresponding fingerprint data about one or more authorized users of the card 400 to determine whether the fingerprint of the person is that of a user authorized to use the card 400. Processor 408 also compares the derived data about the shape of the heartbeat of the person obtained by the heartbeat sensors 410, 414 to heartbeat shape data about the one or more authorized users of the card 400 to determine whether the heartbeat shape of the person is that of a user authorized to access the card 400. The previously obtained data may reside in the memory 412.

Electronic componentry in the card 400 (considered to be hardware and/or software) has a first state preventing use of the card 400 and a second state allowing use of the card 400. This electronic componentry (represented by 416) is designed to transition from its first state to its second state when the processor 408 determines that the fingerprint of the person is that of a user authorized to use the card 400 and the heartbeat shape of the person is that of a user authorized to use the card 400. However, the electronic componentry 416 remains in its first state when either the processor 408 does not determine that the fingerprint of the person is that of a user authorized to use the card 400 or the processor does not determine that the heartbeat shape of the person is that of a user authorized to sue the card 400 (and obviously when both situations are present).

As an example of authorizing access, the electronic componentry 416 controls generation and forwarding of a signal based on content of a chip on the card 400 that is necessary to enable use of the card 400 in a chip-equipped mobile payment terminal. The electronic componentry 416 therefore is directed by the processor 416 to unlock functionality of the card 400 by allowing generation of a signal based on content of the chip in the card 400.

FIGS. 12 and 13 shows a fingerprint sensor 502, 504 with heartbeat monitor 506, 508 on a USB thumb fob or drive 500 having a USB connector 510 at one end (an access-controlled object). The fingerprint sensors 502, 504 are represented by the fingerprints while the heartbeat monitor are shown as 506, 508 underlying the fingerprint sensors 502, 504, respectively. FIGS. 14-16 show a plane view of the top, side and bottom of the thumb drive 500, respectively. A power supply battery for sensors can be mounted inside the housing of the thumb drive 500.

A processor (not designated) is also housed in the housing of the thumb drive 500 and is coupled to the fingerprint sensors 502, 504 and heartbeat monitors/sensors 506, 508 and receives fingerprint data and heartbeat data therefrom. The processor performs the fingerprint comparison and heartbeat shape derivation and then comparison to authenticate the use of the thumb drive 500. If the fingerprint data and/or the heartbeat shape data does not correspond to an authorized user of the thumb drive 500 when the thumb drive 500 is engaged with a mating connector via the USB connector 510, then the processor prevents data transmission through the USB connector 510.

There are many opportunities for using such a thumb drive 500. For example, when coupled with the appropriate cloud-based program, the thumb drive 500 can provide automatic log-ins to various password-protected websites. The cloud-based program can verify that the thumb drive 500 is attached to the computer accessing the cloud-based program by the fingerprint (such as thumb print) and heartbeat shape authentication, using data obtained by the fingerprint sensors 502, 504 and heartbeat monitor/sensors 506, 508, plus the private key challenge mechanism. The owner can securely use the thumb drive 500 in any computer to conduct ordering or banking transactions among others. Electronic componentry in the USB thumb drive 500 (considered to be hardware and/or software) has a first state preventing transmission of content from the memory in the USB thumb drive 500 and a second state allowing access to the content. This electronic componentry, represented by 512 (see FIG. 15), is designed to transition from its first state to its second state when the processor determines that the fingerprint of the person is that of a user authorized to access the memory of the USB thumb drive 500 and the heartbeat shape of the person is that of a user authorized to access the memory of the USB thumb drive 500. However, the electronic componentry 512 is configured to remain in its first state when either the processor does not determine that the fingerprint of the person is that of a user authorized to access the memory of the USB thumb drive 500 or the processor does not determine that the heartbeat shape of the person is that of a user authorized to access the memory of the USB thumb drive 500 (and obviously when both situations are present).

As an example of authorizing access, the electronic componentry 512 controls a linking mechanism of the USB memory with a linking mechanism of the electronic component engaged with the connector 510, and is controlled to permit this linking when the authentication protocol is validated. Memory from the USB thumb drive 500 would not be permitted to be transferred therefrom unless the linking mechanisms are engaged (which results from satisfying the authentication protocol).

Figure 17:
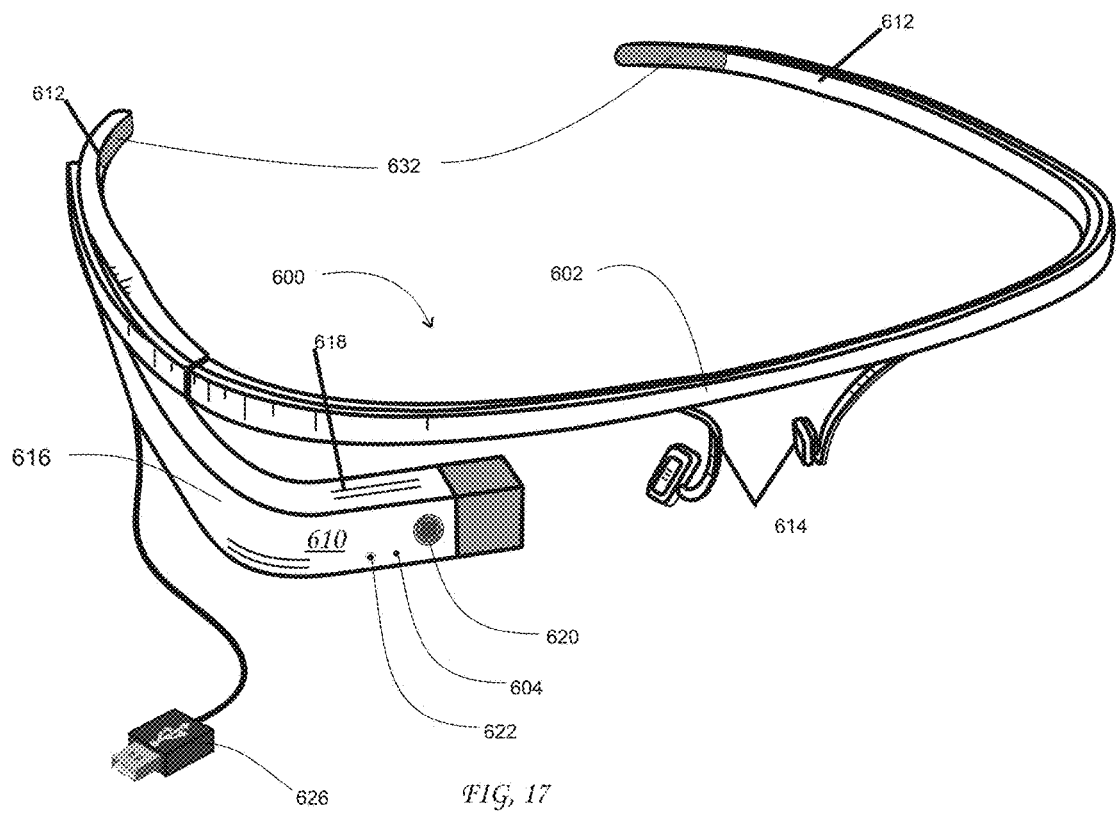
FIGS. 17 and 18 shows MOOC glasses with a heartbeat monitor on the temples.

FIG. 17 shows a pair of eyeglasses referred to as MOOC glasses™ with a heartbeat monitor. This variant is particularly useful for person identification/authentication during MOOC (Massive Open Online Course) student testing and background information about these eyeglasses is described in WO2016028864, incorporated by reference herein. Such glasses can be used for guaranteeing that a student is taking a test alone without the assistance of a consultant or other form of cheating, such as having another person take the test instead. The heartbeat monitor can be mounted inside the frame of such glasses at the temples, or other convenient location with contact with the skin of the student, and be a part of checking system under remote/online tests.

Figure 18:
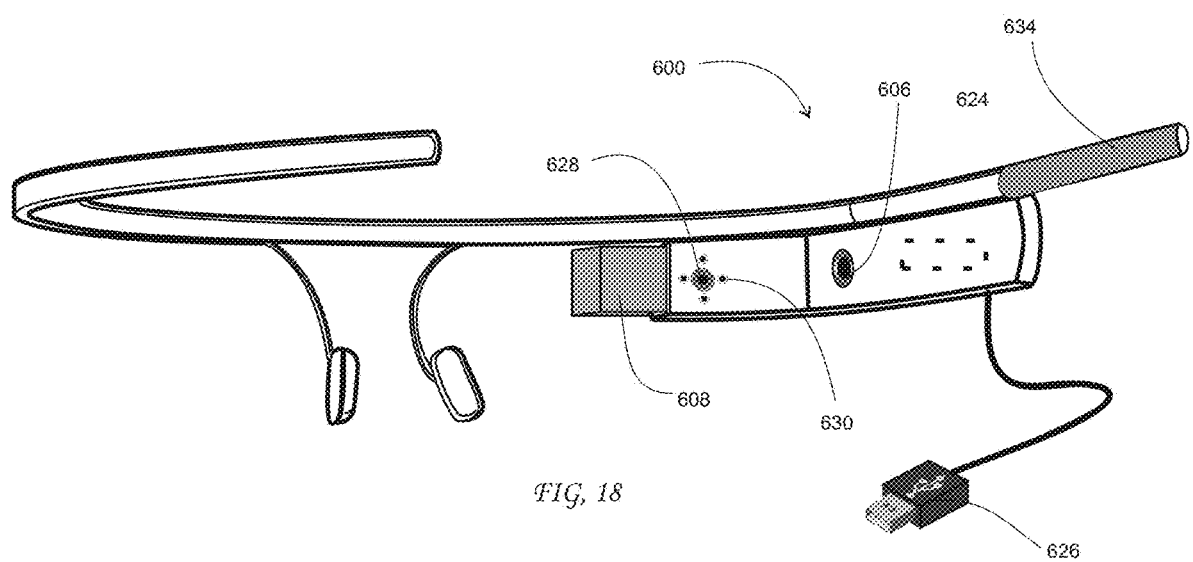

An example of MOOC glasses 600 is illustrated in FIGS. 17 and 18. The glasses 600, containing an electronics assembly with several sensors, cameras and a display are ideally all protected with a chassis intrusion detector prepared using the teachings in WO2016028864. A housing 610 extends from a frame 602 that has temples 612 and a nosepiece 614 to enable it to be supported on a wearer's head in a manner as eyeglasses are commonly worn. Housing 610 is substantially L-shaped having a first portion 616 extending along a side of the glasses 600 forward to a location in front of the front of the frame 602, and a second portion 618 substantially perpendicular to the first portion 616 and positioned in front of the frame 602.

A display 608 extends from the second portion 618 and is preferably arranged toward the right eye of test-taker and used to display test questions during a test (see FIG. 18). The display 608 may be used to display a test and is the access-controlled object of this embodiment.

A forward viewing camera 620 is also arranged in the housing 610 and monitors the field of view of the test-taker. The camera 620 can have a field of view of approximately 120° or more as needed to cover the field of view of the test-taker. One or more microphones 604 are also arranged in housing 610, one is illustrated, which monitors talking or other sounds which can take place while the test is in progress. A sound maker or speaker 622 provides a sound detectable by the microphone(s) 604 so as to verify that the microphone(s) 604 has not somehow been rendered inoperable.

All of the components 604, 608, 620, 622 are connected to an electronics package 624 on the housing 610 which contains appropriate circuitry and signal processing components (the connections being internal and not shown). An external cable contains a USB connector 626 for connecting the electronics package 624 to an external device such as a smartphone or computer (not shown). The smartphone contains another electronics package including a processor that performs functions described herein. The functions performed using the MOOC glasses 600 may be performed by components on the frame 602 and/or in the smartphone connected to the frame 602 by the connector 626 depending on, for example, the design of the MOOC glasses 600.

An iris or retinal scan camera 628 is pointed inward toward the test-taker, and measures biometrics of the test-taker, i.e., obtains biometric data and unless another processor is provided to receive the biometric data from the scan camera 628, the scan camera itself 628 may be configured to access a database of biometric data and perform a comparison of the currently obtained biometric data to the biometric data from the database which is considered to correspond to the test-taker. If there is a variation above a threshold when the comparison is performed by the processor, it is considered that the test-taker is not the intended test-taker. The scan camera 628 is only one example of a biometric data obtaining unit that obtains biometric data or simply biometrics. Such biometrics as obtained by the scan camera 628 can be an iris, retinal scan, a scan of the portion of the face surrounding the eye. Illuminators 630 are arranged around the scan camera 628 to provide illumination when necessary, and are coupled to and controlled by, for example, the electronics package 624 on the frame 602 (see FIG. 18).

Additionally, as an alternative or additional biometric data obtaining unit, a heartbeat monitor 632 can be provided for further student identification, e.g., in one or both temples. As seen in FIGS. 17 and 18, the heartbeat monitor 632 comprises a sensor 634 in both temples 612 (only one of which is shown in FIG. 18, but the other temple 612 includes a similar sensor 634). By obtaining heartbeat data from sensors 634 in both temples 612 that cooperate to provide the heartbeat monitor 632, it is possible to provide the shape of the heartbeat as is otherwise achieved using, for example, an electrocardiogram. By combining the data from multiple heartbeat sensors 634, e.g., one in each temple 612 that are in contact with the test-taker, the shape of the heartbeat of the test-taker can be derived and used to identify and/or confirm the identity of the test-taker as an example of biometric data.

The heartbeat sensors of the heartbeat monitor 632 are therefore coupled to a processor, whether in the electronics package 624 in the housing 610 or in the electronics package in the smartphone coupled to the MOOC glasses 600 by the connector 626. This processor receives data being obtained by the heartbeat sensors 634 and derive the shape of the heartbeat of the person wearing the MOOC glasses 600, i.e., the test-taker. Knowing the identity of the expected test-taker, this heartbeat shape derived using the heartbeat sensors 634 is then compared to the heartbeat shape of the test-taker obtained from a database containing a memory component in which the heartbeat shape of the test-taker is stored. This stored heartbeat shape may be obtained in an initial configuration stage when the MOOC glasses 600 are configured for use with a particular test-taker, using, for example, the heartbeat sensors 634. The comparison is performed by a processor coupled to the memory component and configured to access the appropriate heartbeat shape by providing the identity of the test-taker. If the comparison indicates that the heartbeat shape deviates beyond an acceptable deviation or varies beyond a predetermined threshold, a determination is output by the processor that the test-taker is not the expected test-taker.

Output from the processor is converted into an indication that the test-taking is cheating or has cheated and this indication is associated with the test-taker and the test that the test-taking is taking in a database in a memory component. The database can also include grades for test-takers not found to be cheating after the test given to the other test-takers is graded. The invention therefore encompasses a test grading program and system wherein tests are generated, provided to test-takers using MOOC glasses 600, and then the results of the test are gathered, either grades from test-takers not found to be cheating or an indication of cheating from test-takers found not to have comparable biometric data. Output from the test grading program or system is provided to the test-providing institution.

Other features of this test grading program or system may also be incorporated as in conventional test grading programs and systems used with MOOCs and remote learning. For example, a communication may be generated by a communication unit connected to the processor that determines failure of the authentication of the test-taker, and this communication is acted on to terminate the test for the test-taker or prevent the test-taker from starting the test using the MOOC glasses 600.

The invention thus also encompasses a test-taker authentication system that provides an indication (visual and/or audible) that people taking tests using MOOC glasses 600 are the correct people or not. In such a system, a test monitor would be able to view a display that contains a list of the people expected to take a test, and then an indication of whether the people having the glasses 60 are really those people or not.

A color-based system may be used, e.g., a green indication next to the person's name indicates the person is the proper person to take the test after having been authenticated, while a red indication next to the person's name indicates that they have not been authenticated to take the test. The test monitor can view a tabular display and respond accordingly, e.g., by removing the people that have not been authenticated from a room where the test is being taken. It is of course possible to use the visual and/or audible indication of which people taking a test have been authenticated and which have not in other ways, all of which are encompassed within the scope and spirit of the invention.

The memory component that stores the grades and cheating indications may be accessed by authorized personnel, e.g., a professor coordinating the class and test for the class, to view on a display which test-takers have been found to be cheating. An indication of failure of the test may be associated with each test-taker, e.g., in a tabular display. The test-providing institution can decide how to treat the cheating indication. If the test is the only one in a class, the test-providing institution can consider that the test-taker failed the class/course.

Electronic componentry in the housing 610 or in an electronic component connected to the housing via connector 626 (considered to be hardware and/or software) has a first state preventing transmission of content to the display 608 and a second state allowing transmission and display of content on the display 608. This electronic componentry transitions from its first state to its second state when the scan camera 628 provides data that the iris or retina of the person wearing the glasses 600 is that of an authorized test-taker and the heartbeat shape of the person is that of an authorized test-taker. However, the electronic componentry remains in its first state when either the processor does not determine that the iris or retina of the person is that of an authorized test-taker or the processor does not determine that the heartbeat shape of the person is that of an authorized test-taker (and obviously when both situations are present).

As an example of authorizing access, the electronic componentry controls the display 608 to permit display of test questions or refrain from such display.

Also, such a combination can be used in conjunction with an application on a computer system such that an unauthorized user of the computer system cannot access or view unauthorized content available on the computer system or accessible using the computer system without using the MOOC glasses 600.

A device based on the authentication system of the invention can be used for building entry, garage opening, etc. Generally, it can be integrated into an access device that includes an access-control unit having a first locked state and a second unlocked state, and an actuator (electrical, mechanical or electromechanical structure) to change its state from the first locked state to the second unlocked state. The access device includes a heartbeat monitor and optionally another type of biometric data authenticator. The heartbeat monitor is connected to the actuator and controls the actuator to be actuated to change its state only when the heartbeat shape derived from data obtained by the heartbeat monitor is found to be the same (or within a threshold of similarity to) as that of a person authorized for access.

Figure 23:
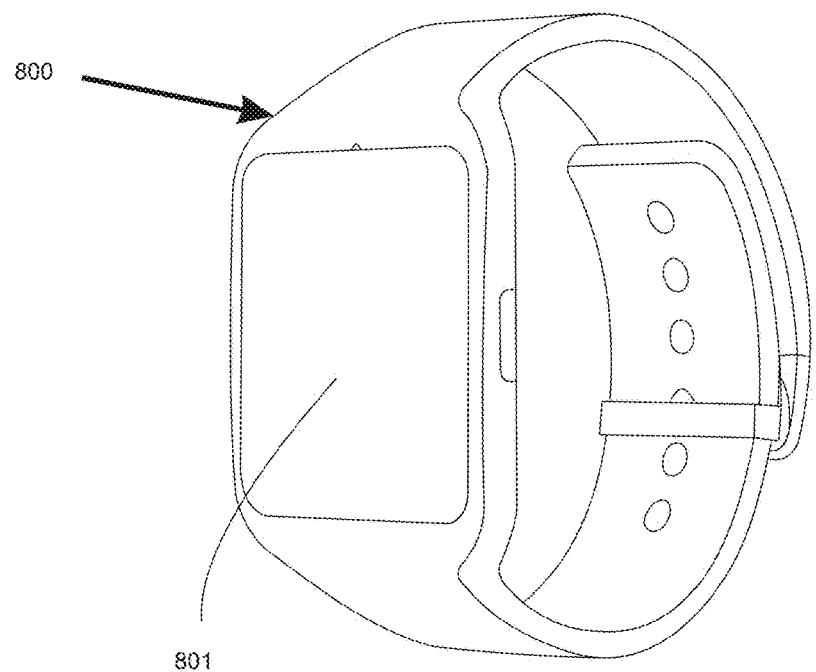
FIGS. 23 and 24 show heartbeat monitors located on a smartwatch
Figure 24:
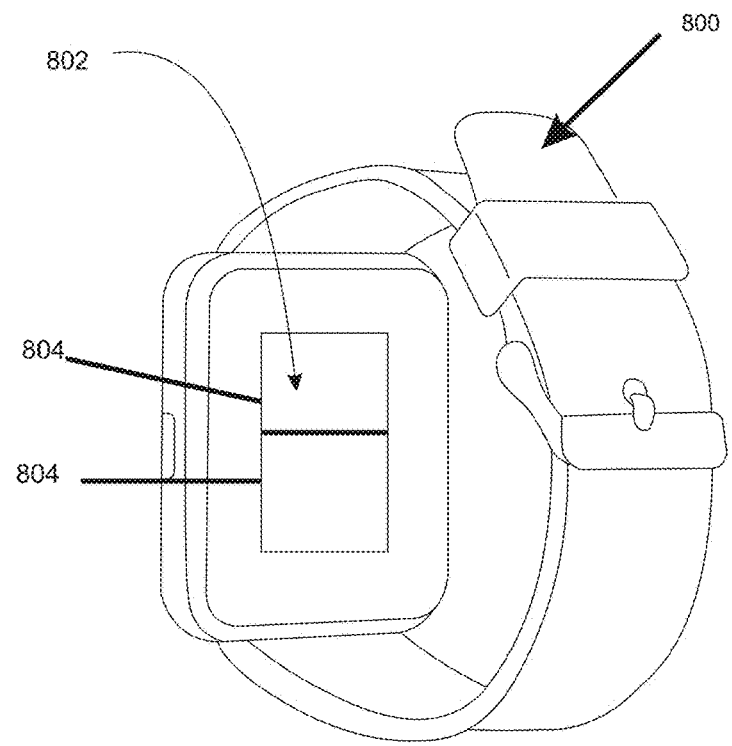

For example, the heartbeat monitor disclosed above can be located at a door handle 705 at FIG. 22. Various types of door handles and car door handles are shown in FIGS. 19-21. Different locations of a heartbeat monitor at a door handle shown as positions 701, 702 and 703. As shown in FIG. 20, a knob 704 has a section which includes a heartbeat monitor 710 and captures the heartbeat which would need to be insulated from the remainder of the apparatus. Since a user may be wearing gloves which would block the sensing of the heartbeat, such entrances would in general need an alternative unlocking mechanism such as the keypad 704 or key hole 706. A fingerprint authentication is not necessary in these embodiments, although it may be integrated into each access device. Only the shape of the heartbeat obtained using the heartbeat monitor 710 or sensor is compared to heartbeat shape data in a memory accessible by a processor coupled to the heartbeat monitor 710 or sensor and based on this comparison, opening of the door or other portal is permitted or prevented. FIGS. 23 and 24 show the principle of a fingerprint sensor with heartbeat measurement applied to a watch 800. A fingerprint sensor for smartwatch unlocking can be combined with watch display 801, while heartbeat monitor 802 can be located at back side of the watch 800. Heartbeat monitor 802 includes two heartbeat sensors 804. The heartbeat shape can be analyzed by a processor within the smartwatch 800, upon receiving input data from the heartbeat monitor 802, and a signal sent to another device via a transmission unit indicating that the authorized person is wearing the smartwatch 800. This signal can be sent wirelessly by Bluetooth, for example, or if greater security is desired, or for some other reason, it can be sent through the body of the person to his finger, for example, allowing the information to be transferred to a sensor without exposing it to be intercepted.

A heartbeat monitor 802 located in a smartwatch 800 can also be used to monitor for medical conditions using the processor. The occurrence of irregular heartbeats, for example, can be detected by the processor performing heartbeat analysis with algorithms, as they occur. Such irregular heartbeats can be life threatening but also very difficult to detect when they occur Similarly, a weak heartbeat or an overly fast heartbeat can forecast a medical condition by such a device in time to cause an alarm and save the life of the wearer. Additionally, many subtle changes in the heartbeat can be detected and become useful as research in this field progresses.

Figure 25:
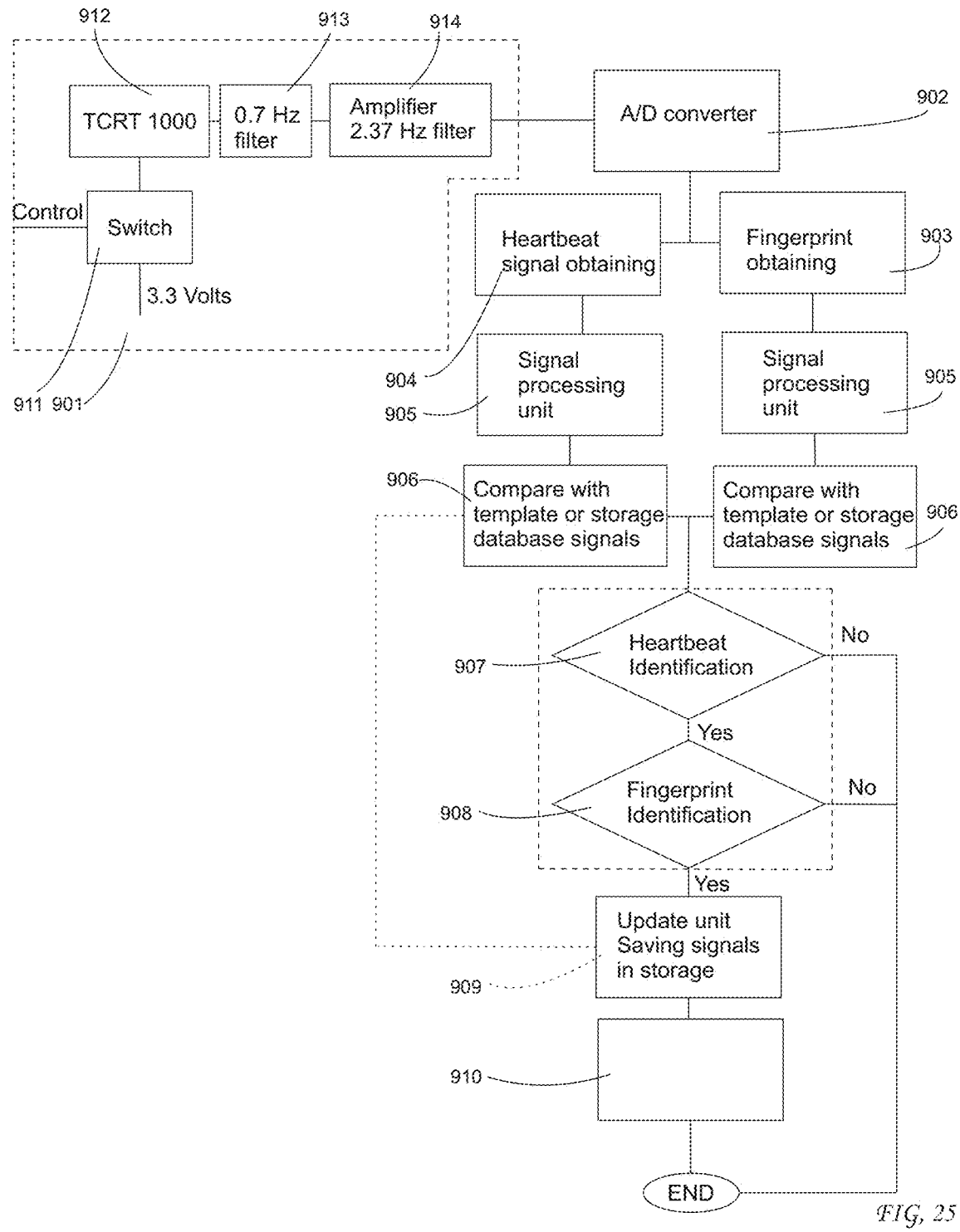
FIG. 25 is a flowchart of the device operability.

FIG. 25 illustrates a flow chart of a typical application of this invention and is mostly self-explanatory.

Bio signal is considered as input and sensed by sensor attached to living body. It can be in form of static device or it can be mounted inside personal devices as cell phones, wrist or smart watches. Fingerprint and heartbeat scanning will be started at the moment when finger touches the monitor surface. The fingerprints are read optically, ultrasonically or capacitively and compared to previously stored fingerprints within device memory.

Heartbeat signals obtain from one person may vary in time, may vary according to person body state. It depends on various factors: daytime, heart load, sport training, health state, emotional state, etc. Thus, acquired personal data must be processed or acquisition will not start until person-specific bio signals return to stable state.

The biometric identification apparatus includes:

Input signal processing unit 901;

A/D converter unit 902. Convert obtaining bio signal to digital form;

Heartbeat and fingerprint signal obtaining 903, 904. These units determine and divide two bio signals from input digital data for further processing;

Signal processing units 905. Processing bio signals by applying one or more identification algorithms;

Comparator units 906. Each compares acquired fingerprint signals or heartbeat shape signals with template signals in database 909;

Two level identification authentication by units 907, 908. Authentication units identify bio signals successively and give access only if both detected signals are from the living body to be authenticated;

Upgrading and saving accepted bio signals in storage or database 909. It updates and stores a plurality of template signals data including obtaining bio signals from the last scan.

Unit 910 is reserved; it may be a communications step to communicate the results of the authentication, or lack of authentication, or partial authentication.

Figure 26:
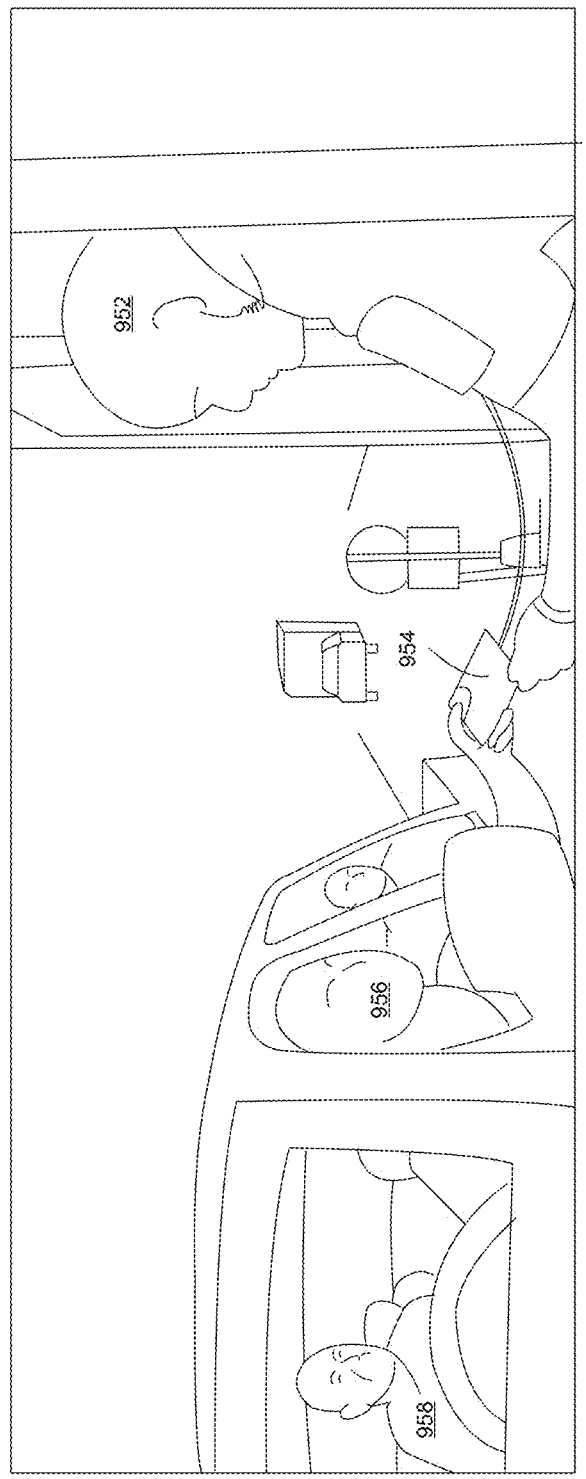
FIG. 26 is a fingerprint and heartbeat scan used at border crossing.

FIG. 26 shows fingerprint and heartbeat scanning procedure while crossing a border or other geographic, access-limited or controlled boundary. A security guard 952 hands a biometric measuring device 954 to the driver 956 of the vehicle. The driver 956 then registers his fingerprint and heartbeat shape by placing his finger on the appropriate sensor 960 on device 954 (or multiple fingers in order to obtain heartbeat shape). The device 954 can also be equipped to acquire a photograph of the driver's face for a face scan and eyes for an iris scan. After completing the process, the driver 956 can hand the device to another occupant 958 in the vehicle who will similarly record the same biometrics after which he/she will pass the device 954 to the next passenger and so on until the biometrics of all occupants of the vehicle have been similarly recorded. The device 954 will be returned to the security guard 952 after all vehicle occupants will have had their data acquired.

The device 954 will be able to perform fingerprint and heartbeat shape analysis to identify each occupant 956, 958, by referencing its database or linking wirelessly to a database of identification data. Each database would include the fingerprint information, heartbeat shape signal information and identification. A simple matrix linking such data may be generated in the database.

Figure 27:
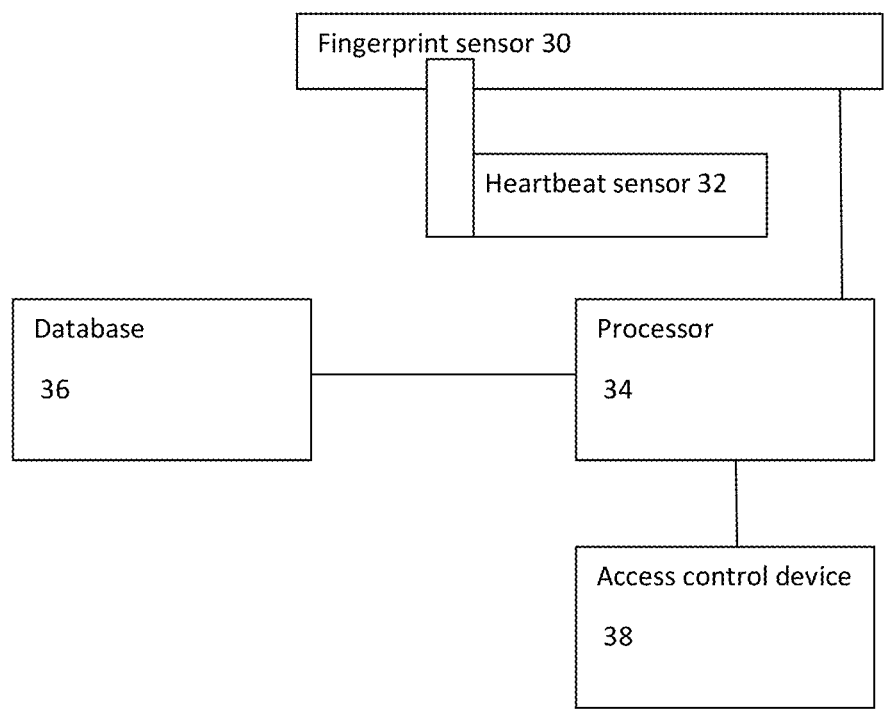
FIG. 27 is a schematic of an arrangement for controlling access in accordance with the invention.

FIG. 27 provides a schematic summarizing essential features of the invention. Specifically, an arrangement in accordance with the invention that controls access to something, e.g., a private key, a smartphone, a credit or debit card, a door, a vehicle, and the other objects mentioned above (an access-controlled object), includes a fingerprint sensor 30 which is integrated with a heartbeat sensor 32. This means that the surface or plate onto which the person places their finger to provide the fingerprint for fingerprint sensor 30 is also capable of interacting with the heartbeat sensor 32 to simultaneously obtain the heartbeat of the person. It is possible for a heartbeat sensor to operate in a contact or non-contact manner, and any such heartbeat sensor may be used in the invention. If contact is required, a contact area can be provided in the middle of or alongside the fingerprint plate. If contact is not required for heartbeat sensor 32 to obtain a heartbeat, then it can be situated below the fingerprint sensor 30.

A processor 34 is coupled to both the fingerprint sensor 30 and the heartbeat sensor 32 and receives signals therefrom representative of the fingerprint of the person and the heartbeat of the person whose finger is pressed against the fingerprint plate (if any). Processor 34 is coupled to a database 36 and performs a comparative analysis of the fingerprint and heartbeat to determine whether the person seeking access is the authorized person. If so, the processor 36 directs the access control device 38 to enable access to the object sought to be accessed by the person. If the fingerprint or the heartbeat, or both, do not correlate to those of the person authorized to obtain access, then the processor 34 does not direct the access control device to enable access and access is prevented.

With the structure disclosed above, it becomes possible to construct a wide variety of systems, arrangements and apparatus that use the shape of the heartbeat as a biometric, whether or not it is measured though a finger or other body part, in one or more of the following applications:
1. Quick launcher (favorite programs and/or applications requiring secure identification).
2. Mobile website log-in where personal identification is required.
3. Mobile banking access and payment authorization (credit cards, safe deposit access).
4. Device unlock (smartphone, fob).
5. Privacy look (files and folders).
6. Building entry/garage opening.
7. Visitor identification.
8. Time and attendance recording.
9. Device unlock (cars, doors).
10. Indirect uses including putting a heartbeat sensor into smartwatch or wearable bracelet which sends an encrypted message verifying the wearer either wirelessly or through body conduction upon interrogation. The same device can be used to monitor health changes which are expressed in the shape of the heartbeat.

Use of the disclosed invention in each and every one of these applications is considered part of the invention. One skilled in the art would readily be able to make and use a system, arrangement or apparatus that performs one of the applications based on their knowledge and the disclosure herein.

Another way to consider the disclosed inventions is as a biometric security system including a housing, a biometric scanner system arranged on the housing to receive biometric data from a person when interacting with the scanner system (including a heartbeat monitor having at least two contact areas), a secured unit having access restricted only to authorized persons, a security release mechanism that enables access to the secured unit, a memory component, and a processor coupled to the memory component, the scanner system and the secured unit. The processor derives data about shape of a heartbeat of the person when the person is in contact with the biometric scanner system at the at least two locations. It also compares the derived data about the shape of the heartbeat of the person to heartbeat shape data about the persons authorized to access the secured unit to determine whether the person providing the heartbeat shape is one of the persons authorized to access the secured unit. Finally, the processor actuates the security release mechanism to enable the person interacting with the scanner system to access the secured unit only when the processor determines that the heartbeat shape is from one of the persons authorized to access the secured unit.

Various secured unit and security release mechanisms are described above. For example, when the housing is a housing of a portable telecommunications unit, the secured unit includes an operating system of the telecommunications unit and the security release mechanism includes an unlocking mechanism for enabling use of the telecommunications unit (FIG. 1). When the housing is a credit card, the secured unit is an authorized use system of the credit card and the security release mechanism is a credit card authorization mechanism for enabling use of the credit card using the authorized use system (FIG. 11). When the housing is attached to an eyeglass frame having a display coupled thereto, the secured unit is an operating system of the display and the security release mechanism is an unlocking mechanism for enabling use of the display (FIGS. 17 and 18). When the secured unit is a door, the security release mechanism is a door release mechanism for enabling opening of the door (FIGS. 19-22).

The invention may be integrated into structure that controls access to objects. The biometric security system may be part of a door and integrated into the handle or knob (FIGS. 19-22). A door including such a biometric security system is therefore considered an invention herein. The door opens by the security system, for example, allowing turning of the handle, removing a physical barrier to door opening, or actuating a component that allows movement of a latch preventing door opening, but only when the processor of the biometric security system outputs a signal that the person grasping the handle or knob passes the authentication protocol. Otherwise, the handle is unable to turn, the physical barrier remains in place and/or the latch is not moved.

A similar physical embodiment is applicable to the remaining structural embodiments. For example, the USB drive in FIGS. 12-16 may include the biometric security system and include a software subroutine that when executed by a processor on the USB drive does not allow communication protocol to be established via the USB connector. Without such communications protocol being established, the data on the USB drive cannot be transmitted through the connector to the electronic component it is connected to.

Furthermore, the watch shown in FIGS. 23 and 24 can be a smartwatch that is configured to be accessed only by its owner since its use can be programmed to allow for personal actions, such as payment processing. Security of the watch is implemented by integrating the biometric security system in the watch and causing the processor of the smartwatch to process the heartbeat data and the fingerprint to control usage. A software program linked to the startup menu, for example, appears only when the biometric security system outputs a signal that the person wearing the watch passed the authentication protocol. A watch with an integrated biometric security system is therefore an invention herein.

Several computer programs resident on transitory or non-transitory computer-readable media may be used in the invention and their function and non-limiting location are mentioned above. One computer program may reside in each device that performs the fingerprint and heartbeat signal analysis. Another computer program may perform the steps of the flowchart shown in FIG. 10. In the context of this document, computer-readable media or medium could be any non-transitory means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the following claims.

The invention claimed is:

1. An authentication system, comprising; a head-supported frame configured to contact different parts of a head of a person when said frame is supported on the person; a display coupled to said frame in a position to be at least partly in front of the person when said frame is supported on the person and visible by an eye of the person when said frame is supported on the person; a biometric sensor arranged in or on said frame to obtain biometric data of a person seeking access to or use of said display; a heartbeat monitor arranged in or on said frame and having at least two spaced apart contact areas, said at least two contact areas being configured to individually contact the different parts of the head of the person at the same time when said frame is supported on the person such that as a result of the support of said frame on the head of the person, said at least two contact areas contact the different parts of the head of the person at the same time and enable a voltage to develop between said at least two contact areas, said heartbeat monitor being additional to said biometric sensor; a processor coupled to said biometric sensor, said heartbeat monitor and said display, said processor deriving, from the voltage, data about shape of a heartbeat of the person from data obtained by said heartbeat monitor when the different parts of the head of the person are in contact with said at least two contact areas at the same time, said processor comparing the biometric data obtained by said biometric sensor to corresponding biometric data about one or more authorized users of said display to determine whether the biometric of the person is that of a user authorized to access or use said display, said processor comparing the data about the shape of the heartbeat of the person obtained by said heartbeat monitor to heartbeat shape data about the one or more authorized users of said display to determine whether the heartbeat shape of the person is that of a user authorized to access or use said display; and an access-control unit that controls display of content on said display based on whether said access-control unit is in a first state preventing access to or use of said display or a second state allowing access to or use of said display, said access-control unit transitioning from its first state to its second state when said processor determines that the biometric data of the person is that of a user authorized to access or use said display and the heartbeat shape of the person is that of a user authorized to access or use said display, and said access-control unit remaining in its first state when said processor does not determine that the biometric data of the person is that of a user authorized to access or use said display or does not determine that the heartbeat shape of the person is that of a user authorized to access or use said display.

2. The system of claim 1, further comprising a memory component including a database that stores biometric data and heartbeat shape data about the one or more authorized users of said display.

3. The system of claim 2, wherein said memory component is arranged in or on said frame.

4. The system of claim 1, wherein said processor is arranged in or on said frame.

5. The system of 1, wherein said biometric sensor comprises an iris or retinal scan camera in or on said frame in a position to image an eye of the person when said frame is supported on the person.

6. The system of claim 1, wherein said access-control unit comprises electronic circuitry that controls display of content on said display and is directed by said processor to display content in its second state and refrain from displaying content in its first state.

7. The system of claim 1, wherein said biometric sensor comprises an iris or retinal scan camera in or on said frame in a position at a front of said frame to image an eye of the person when said frame is supported on the person, said access-control unit comprising electronic circuitry that controls display of content on said display and being directed by said processor to display a test in its second state.

8. The system of claim 1, wherein said frame includes two temples configured to contact opposite sides of the head of the person when said frame is supported on the person, said at least two contact areas comprising a first contact area on a first one of said two temples and a second contact area on a second one of said two temples.

9. The system of claim 8, wherein said frame further includes a nosepiece configured to contact a nose of the person when said frame is supported on the person.

10. The system of claim 8, wherein said first contact area is at an end region of said first one of said two temples and said second contact area is at an end region of said second one of said two temples.

11. A system, comprising: a head-supported frame including two temples configured to contact opposite sides of the head of a person when said frame is supported on the person; a display coupled to said frame in a position to be at least partly in front of the person when said frame is supported on the person and visible by an eye of the person when said frame is supported on the person; a heartbeat monitor having two contact areas one on each of said temples, said contact areas being configured to individually contact the opposite sides of the head of the person at the same time when said frame is supported on the person such that as a result of the support of said frame on the head of the person, said contact areas contact the opposite sides of the head of the person at the same time and enable a voltage to develop between said contact areas; a processor coupled to said heartbeat monitor and said display, said processor deriving, from the voltage, data about shape of a heartbeat of the person from data obtained by said heartbeat monitor when the opposite sides of the head of the person are in contact with said contact areas at the same time, said processor comparing the data about the shape of the heartbeat of the person obtained by said heartbeat monitor to heartbeat shape data about one or more authorized users of said display to determine whether the heartbeat shape of the person is that of a user authorized to access or use said display; a biometric sensor additional to said heartbeat monitor and arranged in or on said frame to obtain biometric data of a person seeking access to or use of said display; a memory component including a database that stores the heartbeat shape data and biometric data about the one or more authorized users of said display; and an access-control unit that controls display of content on said display based on whether said access-control unit is in a first state preventing access to or use of said display and a second state allowing access to or use of said display, said access-control unit transitioning from its first state to its second state when said processor determines that the biometric data of the person is that of a user authorized to access or use said display and the heartbeat shape of the person is that of a user authorized to access or use said display, and said access-control unit remaining in its first state when said processor does not determine that the heartbeat shape of the person is that of a user authorized to access or use said display; said processor being coupled to said biometric sensor and comparing the biometric data obtained by said biometric sensor to corresponding biometric data about one or more authorized users of said display in said memory component to determine whether the biometric data of the person is that of a user authorized to access or use said display, said access-control unit remaining in its first state when said processor does not determine that the biometric data of the person is that of a user authorized to access or use said display.

12. The system of claim 11, wherein said biometric sensor comprises an iris or retinal scan camera in or on said frame in a position at a front of said frame to image an eye of the person when said frame is supported on the person, said access-control unit comprising electronic circuitry that controls display of content on said display and being directed by said processor to display a test in its second state.

* * * * *